(12) United States Patent
Barnum et al.

(10) Patent No.: US 12,437,043 B2
(45) Date of Patent: Oct. 7, 2025

(54) FINGERPRINT-BASED CREDENTIAL ENTRY

(71) Applicant: Capital One Services, LLC, McLean, VA (US)

(72) Inventors: Eric K. Barnum, Midlothian, VA (US); Robert Dwane Wokaty, Jr., Glen Allen, VA (US)

(73) Assignee: Capital Once Services, LLC, McLean, VA (US)

( * ) Notice: Subject to any disclaimer, the term of this patent is extended or adjusted under 35 U.S.C. 154(b) by 431 days.

(21) Appl. No.: 17/453,772

(22) Filed: Nov. 5, 2021

(65) Prior Publication Data
US 2023/0146678 A1 May 11, 2023

(51) Int. Cl.
G06F 21/32 (2013.01)
G06V 40/12 (2022.01)
G06V 40/13 (2022.01)

(52) U.S. Cl.
CPC .............. *G06F 21/32* (2013.01); *G06V 40/13* (2022.01); *G06V 40/1365* (2022.01)

(58) Field of Classification Search
USPC .......................................................... 706/17
See application file for complete search history.

(56) References Cited

U.S. PATENT DOCUMENTS

| 7,044,368 | B1 | 5/2006 | Barron |
| 9,016,584 | B2 | 4/2015 | Doughty et al. |
| 10,076,920 | B2 * | 9/2018 | Mohmedi ........ G06K 19/07354 |
| 10,769,634 | B2 * | 9/2020 | Azzam ................ G06Q 20/4016 |
| 2004/0195314 | A1 * | 10/2004 | Lee ......................... G07C 9/257 235/380 |
| 2005/0169504 | A1 | 8/2005 | Black |

(Continued)

FOREIGN PATENT DOCUMENTS

EP 1575004 A1 9/2005

OTHER PUBLICATIONS

International Search Report and Written Opinion for Application No. PCT/US2022/078985, mailed on Feb. 23, 2023, 10 pages.

(Continued)

*Primary Examiner* — Atta Khan
(74) *Attorney, Agent, or Firm* — Harrity & Harrity, LLP

(57) ABSTRACT

In some implementations, a physical medium for fingerprint-based PIN entry may include a fingerprint scanner, one or more memories that store fingerprint data and a PIN, and one or more processors. The physical medium may receive power from a terminal that is in communication with the physical medium. The physical medium may scan a fingerprint using the fingerprint scanner and the power received from the terminal. The physical medium may compare scanned fingerprint data, determined based on scanning the fingerprint, and the stored fingerprint data using the power received from the terminal. The physical medium may determine that the scanned fingerprint data sufficiently matches the stored fingerprint data based on comparing the scanned fingerprint data and the stored fingerprint data. The physical medium may transmit the PIN to the terminal based on determining that the scanned fingerprint data sufficiently matches the stored fingerprint data.

20 Claims, 8 Drawing Sheets

(56) References Cited

U.S. PATENT DOCUMENTS

| | | | | |
|---|---|---|---|---|
| 2006/0113381 | A1* | 6/2006 | Hochstein | G06K 19/07345 |
| | | | | 235/382 |
| 2006/0242693 | A1* | 10/2006 | Kussmaul | G06F 21/32 |
| | | | | 726/9 |
| 2007/0073619 | A1 | 3/2007 | Smith | |
| 2007/0214093 | A1* | 9/2007 | Colella | G07C 9/257 |
| | | | | 705/67 |
| 2016/0021107 | A1* | 1/2016 | Lazzaro | H04L 63/0861 |
| | | | | 235/492 |
| 2016/0246954 | A1* | 8/2016 | Kim | G06V 40/12 |
| 2018/0336554 | A1* | 11/2018 | Trotter | H04L 63/0853 |
| 2019/0272365 | A1* | 9/2019 | Huh | H04L 63/0853 |
| 2021/0035109 | A1 | 2/2021 | Wong et al. | |
| 2021/0166234 | A1* | 6/2021 | Anderson | G06Q 20/10 |
| 2021/0256241 | A1* | 8/2021 | Baker | G06F 1/32 |
| 2021/0320798 | A1* | 10/2021 | Likhomanov | H04L 9/3231 |
| 2022/0165079 | A1* | 5/2022 | Wang | G06V 40/1306 |

OTHER PUBLICATIONS

"Driving cardholder security and convenience," Mastercard, https://www.mastercard.us/en-us/business/overview/safety-and-security/authentication-services/biometrics/biometrics-card.html.

"Fingerprint authentication moves from phones to payment cards," Visa, https://usa.visa.com/visa-everywhere/security/biometric-payment-card.html.

"EMV card with fingerprint biometrics—Introducing the biometric payment card," Thales, https://www.thalesgroup.com/en/markets/digital-identity-and-security/banking-payment/cards/emv-biometric-card.

* cited by examiner

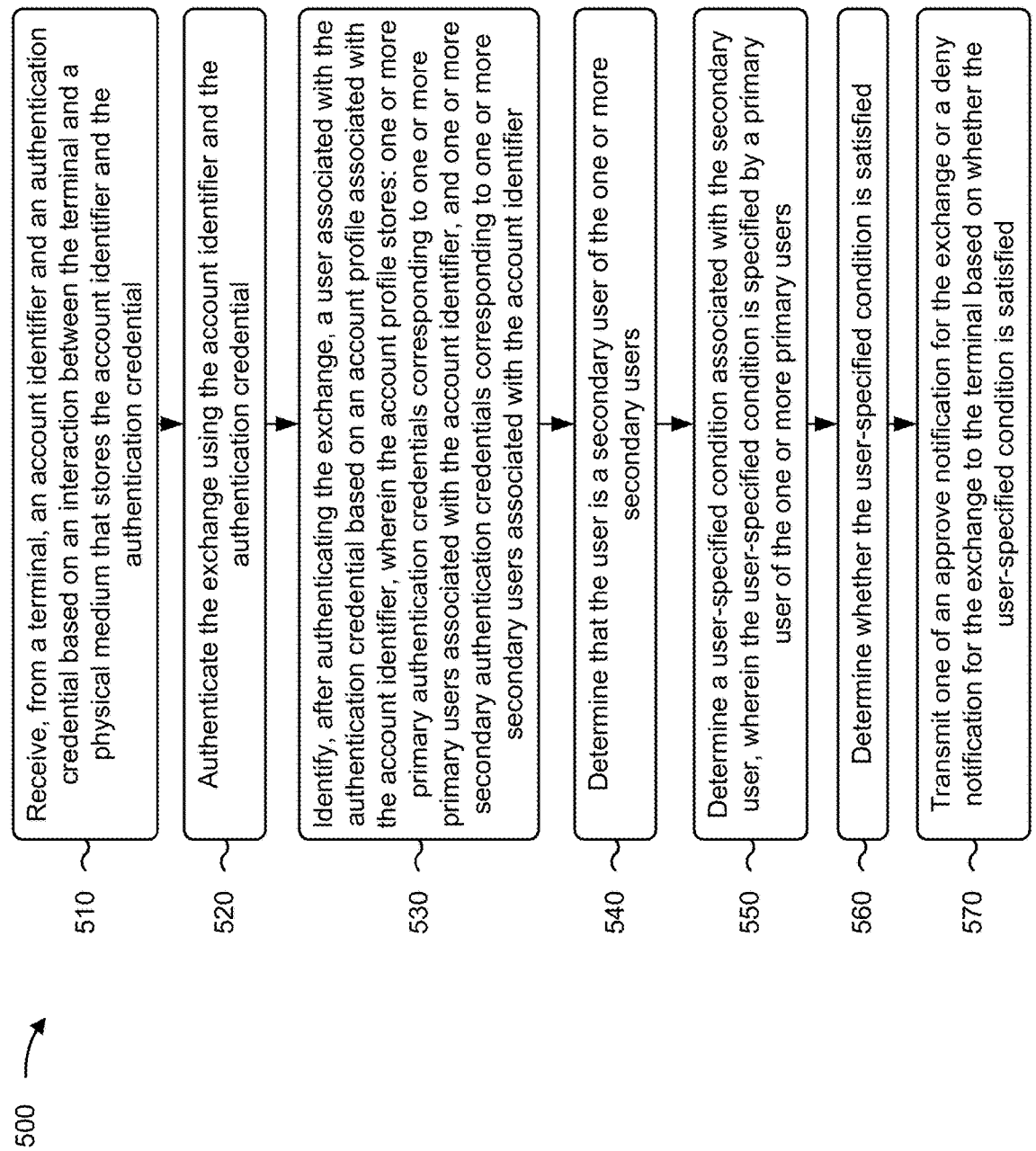

FINGERPRINT-BASED CREDENTIAL ENTRY

BACKGROUND

Biometric authentication is an identification and/or security process that uses a biologically unique identifier (e.g., fingerprint, voice, iris, retina, or face) of an authorized user (e.g., an account owner, a device owner, or the like) to authenticate a user trying to gain access to physical and/or digital resources (e.g., an account or a device). The process includes scanning a biologically unique identifier of the user trying to gain access and comparing the scan to a stored copy of the biologically unique identifier of the authorized user. If there is a sufficient match, then the user is granted access to the physical and/or digital resources.

SUMMARY

Some implementations described herein relate to a system for fingerprint-based authentication. The system may include a physical medium that includes a fingerprint scanner, a processor, and memory that stores fingerprint data, an account identifier, and an authentication credential for use with authenticating an exchange. The physical medium may be configured to receive power from a terminal that is in communication with the physical medium for performing the exchange. The physical medium may be configured to scan a fingerprint using the fingerprint scanner. The physical medium may be configured to compare scanned fingerprint data, determined based on scanning the fingerprint, and the stored fingerprint data using the power received from the terminal. The physical medium may be configured to determine that the scanned fingerprint data sufficiently matches the stored fingerprint data based on comparing the scanned fingerprint data and the stored fingerprint data. The physical medium may be configured to transmit, to the terminal, the authentication credential and the account identifier based on determining that the scanned fingerprint data sufficiently matches the stored fingerprint data. The system may include a processing system that includes one or more memories and one or more processors communicatively coupled to the one or more memories. The one or more processors may be configured to receive the account identifier and the authentication credential from the terminal. The one or more processors may be configured to verify that the authentication credential is valid for the account identifier. The one or more processors may be configured to transmit an approve notification to the terminal based on verifying that the authentication credential is valid for the account identifier.

Some implementations described herein relate to a physical medium for fingerprint-based personal identification number (PIN) entry. The physical medium may include a fingerprint scanner, one or more memories that store fingerprint data and a PIN, and one or more processors communicatively coupled to the one or more memories. The one or more processors may be configured to receive power from a terminal that is in communication with the physical medium. The one or more processors may be configured to scan a fingerprint using the fingerprint scanner and the power received from the terminal. The one or more processors may be configured to compare scanned fingerprint data, determined based on scanning the fingerprint, and the stored fingerprint data using the power received from the terminal. The one or more processors may be configured to determine that the scanned fingerprint data sufficiently matches the stored fingerprint data based on comparing the scanned fingerprint data and the stored fingerprint data. The one or more processors may be configured to transmit the PIN to the terminal based on determining that the scanned fingerprint data sufficiently matches the stored fingerprint data.

Some implementations described herein relate to a method of authentication. The method may include receiving, by a system and from a terminal, an account identifier and an authentication credential based on an interaction between the terminal and a physical medium that stores the account identifier and the authentication credential, where the authentication credential and the account identifier are communicated from the physical medium to the terminal in connection with an exchange. The method may include authenticating, by the system, the exchange using the account identifier and the authentication credential. The method may include identifying, by the system and after authenticating the exchange, a user associated with the authentication credential based on an account profile associated with the account identifier, wherein the account profile stores, one or more primary authentication credentials corresponding to one or more primary users associated with the account identifier, and one or more secondary authentication credentials corresponding to one or more secondary users associated with the account identifier. The method may include determining, by the system, that the user is a secondary user of the one or more secondary users. The method may include determining, by the system, a user-specified condition associated with the secondary user, wherein the user-specified condition is specified by a primary user of the one or more primary users. The method may include determining, by the system, whether the user-specified condition is satisfied. The method may include transmitting, by the system, one of an approve notification for the exchange or a deny notification for the exchange to the terminal based on whether the user-specified condition is satisfied.

BRIEF DESCRIPTION OF THE DRAWINGS

FIGS. 4 and 5 are flowcharts of example processes relating to fingerprint-based credential entry.

DETAILED DESCRIPTION

Figure 1A:
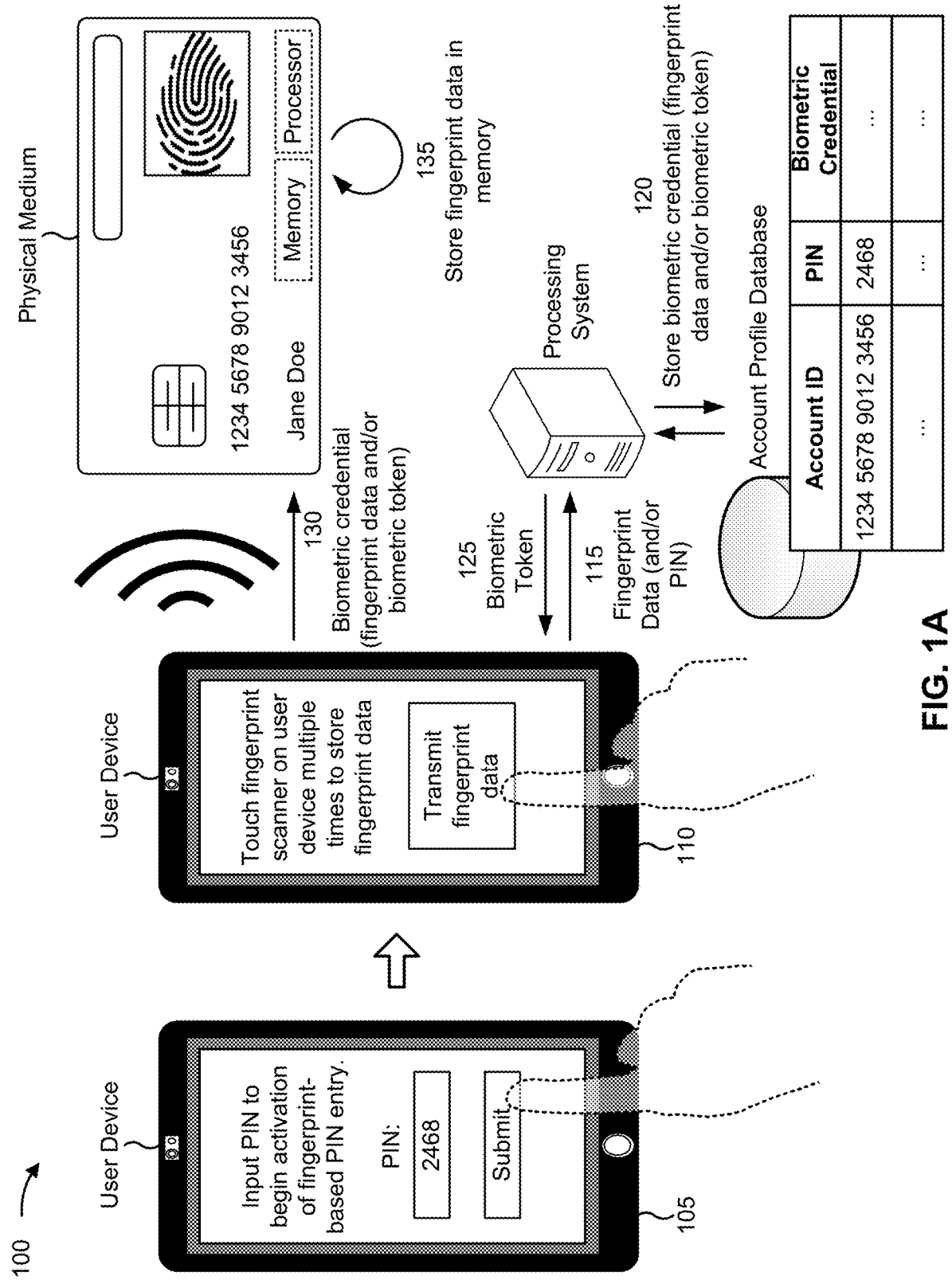
FIGS. 1A-1D are diagrams of an example implementation relating to fingerprint-based credential entry.

The following detailed description of example implementations refers to the accompanying drawings. The same reference numbers in different drawings may identify the same or similar elements.

Modern transaction cards (e.g., automated teller machine (ATM) cards, debit cards, credit cards, or gift cards) contain embedded integrated circuits to store authentication data that is provided to an authenticating device or terminal (e.g., a point-of-sale (PoS) terminal or an ATM) at the time of a transaction. For some transaction cards, the authentication data may be a fingerprint of a cardholder stored on the transaction cards, which may provide more security than, for example, a personal identification number (PIN). The transaction cards may employ fingerprint scanners that require a user to provide a fingerprint at the time of the transaction. In one example of such a transaction card, a digital template of the cardholder's fingerprint is stored in memory of the transaction card. When a user presents the transaction card at the terminal, the transaction card, via the fingerprint scanner embedded on the transaction card, scans the user's fingerprint and matches it to the digital template of the cardholder's fingerprint stored in the memory of the transaction card. If there is a successful match, the transaction is authenticated. No authentication data is transmitted from the transaction card to the terminal.

However, such transaction cards that utilize fingerprint authentication still may be exploited (e.g., by lifting a fingerprint pattern from a fingerprint reader that has not been wiped clean). Because the authentication data (e.g., fingerprints) are maintained solely on the transaction cards, there are no additional layers of security beyond the transaction cards themselves (e.g., if the fingerprint pattern is lifted and/or replicated). Furthermore, given the small footprint of the transaction cards, the amount of storage space on which to store the fingerprints is limited. Thus, the transaction cards offer limited to no flexibility for the account holder as to who may be authorized to use the transaction card.

Some implementations described herein relate to a system for fingerprint-based authentication (e.g., an authentication system) that includes a physical medium (e.g., a transaction card) and a processing system. The physical medium stores fingerprint data corresponding to one or more fingerprints (e.g., thumbprints) of respective authorized users (e.g., the account holder and/or users authorized by the account holder), a biometric credential (e.g., unique identifier generated from the fingerprint data corresponding to the user and the account) for each fingerprint, and/or a PIN corresponding to the account. During a transaction at a terminal (e.g., an ATM, a PoS terminal, a kiosk machine, or a ticketing machine), the physical medium, via a fingerprint scanner on or in the physical medium, scans a fingerprint of the user. If the corresponding scanned fingerprint data substantially matches the stored fingerprint data, then the physical medium may transmit an authentication credential (e.g., the biometric credential and/or the PIN) to the terminal. The processing system in turn may receive the authentication credential from the terminal. The processing system then may determine whether or not there are any conditions, as stored by the processing system, that are met, which would prevent authorization of the transaction (e.g., the biometric credential received by the terminal does not match any biometric credentials stored by the processing system). Depending on this determination, the processing system may send a notification to the terminal approving or declining the transaction.

In some implementations described herein, an account holder and/or authorized user may be able to selectively enable and disable the fingerprint-based authentication feature on the physical medium (e.g., for a particular user or for all users). The processing system may track and/or store the enabled/disabled status of the physical medium. As such, when the processing system receives a request for approval from a terminal, the processing system may determine whether the feature is enabled or disabled. If the processing system determines that the feature is disabled, the processing system may decline the transaction. Thus, the authentication system provides protection against situations in which the physical medium has been stolen, and the account holder disables the fingerprint-based authentication feature as a result, even if the person who stole the physical medium is able to replicate/lift the account holder's fingerprint.

In some implementations described herein, the physical medium may be able to store and access fingerprint data and biometric credentials for multiple users (e.g., the account holder and any authorized users). Additionally, through the processing system, the account holder may be able to designate a primary user and secondary users. The account holder may be able to place restrictions on secondary users (e.g., limits on funds, set times and/or days that the secondary users may use the physical medium, and/or the like). Thus, the authentication system provides added security, even with multiple users on the account, through the use of the biometric credentials.

FIGS. 1A-1D are diagrams of an example 100 associated with fingerprint-based credential entry. As shown in FIGS. 1A-1D, example 100 includes a processing system, an account profile database, a user device, a terminal, a physical medium (e.g., a card), and an exchange database. These devices are described in more detail in connection with FIGS. 2 and 3.

As shown in FIG. 1A, a user (e.g., an authorized user of an account, or an account holder) may use a user device to set up and/or activate fingerprint-based credential entry (e.g., a biometric credential) for the account. The fingerprint-based credential entry may be used in relation to a physical medium, such as a transaction card (e.g., ATM card, debit card, credit card, or gift card). The user device may include a fingerprint scanner. For example, the user device may be a mobile phone, as shown in FIG. 1A, a computer, an ATM, a fingerprint scanning machine (e.g., at a bank branch location), or the like that includes an optical scanner, a capacitance scanner, an ultrasonic scanner, or a thermal scanner. A phone or computer may allow for the user to set up and/or activate the fingerprint-based credential entry at the user's convenience (e.g., time and location). Alternatively, an ATM and/or fingerprint scanning machine at a bank branch location may be convenient for the user to set up and/or activate the fingerprint-based credential at the same time as setting up an account and/or under the supervision and security of the bank.

The account may have an account identifier (e.g., an account ID number, a primary account number (PAN), or a virtual card number) and one or more authentication credentials (e.g., a PIN or biometric credential) associated with the account. The account identifier may be separately stored by the processing system and the physical medium. The account holder and/or an authorized user may gain access to and/or control of the account (e.g., use information and/or resources of the account, or change settings of the account) via the one or more authentication credentials. The one or more authentication credentials may be associated with each other and/or the account identifier by the processing system (e.g., in the account profile database).

As shown by reference number 105, the user of the user device may input a PIN via the user device. For example, the user device may present to the user a designated entry field on a display of the user device in which the user may enter the PIN (e.g., via a physical keyboard, a virtual keyboard, or a voice entry). As further shown by reference number 105, the user may then submit the PIN (e.g., by pressing a submit button on a touchscreen of the user device or a physical submit or enter button, or by a voice command). In some implementations, the user may submit the PIN to be set up as an authentication credential for the account (e.g., in connection with fingerprint-based credential entry). Alternatively, in scenarios in which the PIN is already set up as an authentication credential for the account (e.g., for a physical medium used for the account that does not initially use fingerprint-based credential entry), the entered PIN may serve to authenticate the user and grant the user access to the account to set up and/or activate the fingerprint-based credential entry for the account. For example, the user device may have a PIN corresponding to the account stored internally on the user device (e.g., on a hard drive) or the PIN may be stored externally on a remote server or database (e.g., in a cloud computing environment and/or the processing system). The user device may obtain and compare the stored PIN with the entered PIN to determine if the two match each other (e.g., the stored PIN and the entered PIN are the same). Additionally, or alternatively, the user device may transmit the entered PIN to a remote server (e.g., over a network). The remote server then may compare the entered PIN with the stored PIN, and, if the two match each other, transmit approval to the user device to grant the user access to the account to proceed to set up and/or activate the fingerprint-based credential entry.

As shown by reference number 110, after the authorized user has submitted the PIN, the user device then may scan, via the fingerprint scanner of the user device, one or more fingerprints of the authorized user and/or any other users authorized by the authorized user. The term "fingerprint," as used herein is intendedly to broadly include a print of any digit, including any finger or thumb, and includes a "thumbprint." For example, the user device may instruct (e.g., present instructions in text on the display of the user device or via voice through a speaker of the user device) a particular user to place a finger on the fingerprint scanner. The user device may detect a user interaction with the fingerprint scanner (e.g., the user's finger pressing on the fingerprint scanner one or more times) until the user device determines that the scan of the fingerprint is complete (e.g., the scan satisfies a threshold amount of unique identifier information captured from the scan). The user device may provide a notification that the scan is complete. The scan may be in the form of data associated with the fingerprint (e.g., fingerprint data). For example, the scan may be a digital representation of the scanned fingerprint, such as multiple minutiae points (e.g., 17 to 35 minutiae points) that represent the major features of the fingerprint image. The user device may temporarily store the fingerprint data (e.g., in the user device's random access memory (RAM)) or permanently store the fingerprint data (e.g., on the user device's hard drive). As further shown by reference number 110, the user may select (e.g., by pressing a submit button on a touchscreen of the user device or a physical submit or enter button, or by a voice command) to transfer the fingerprint data.

As shown by reference number 115, the processing system may receive the fingerprint data and/or the PIN from the user device (e.g., over a network described in more detail below). As shown by reference number 120, the processing system may store (e.g., in an account profile database) the fingerprint data as a biometric credential for each scanned fingerprint and may associate the biometric credential with the account identifier and/or the PIN. Additionally, or alternatively, the processing system may generate a biometric token from the fingerprint data for each scanned fingerprint. For example, the biometric token may be a unique identifier (e.g., a series of alphanumeric characters) for each fingerprint. The processing system may have access to all biometric tokens (e.g., stored in the account profile database), and may generate a biometric token that is globally unique (e.g., differs from all other biometric tokens stored in the account profile database). In this respect, the biometric token is distinct from the PIN because multiple users and/or accounts may have the same PIN, whereas each biometric token is unique to a user. Additionally, the biometric token may be smaller (e.g., require less storage space and/or memory) than the fingerprint data, which conserves memory resources. For example, the processing system may generate the biometric token by applying a hashing algorithm or another algorithm to the fingerprint data (e.g., the minutiae points), which may compress the fingerprint data. As shown by reference number 125, the processing system may transmit the biometric token to the user device, which may store the biometric token and/or transmit the biometric token to the physical medium, as described below.

As shown by reference number 130, the physical medium may receive the biometric credential (e.g., the fingerprint data and/or the biometric token) for one or more users from the user device, for example, over a wireless network (e.g., near field communication (NFC), radio frequency (RF), or the like). In some implementations, the physical medium may also receive the PIN from the user device (e.g., in connection with receiving the biometric credential), such as when the PIN is being set up or updated and/or when the PIN is used to authenticate a user and permit storage of the biometric credential. For example, in some implementations (e.g., when a PIN has already been set up), the physical medium may compare a PIN received from the user device to a PIN stored by the physical medium. If the PINs match, then the physical medium may store the fingerprint data and/or the biometric token. If the PINs do not match, then the physical medium may refrain from storing the fingerprint data and/or the biometric token. This provides additional security to prevent fingerprint data from being stored and/or overwritten by an unauthorized user. The physical medium may have a processor, a memory, a fingerprint scanner, and an embedded microchip via which the physical medium may receive and/or transmit data (e.g., the fingerprint data, the biometric token, and/or the PIN). As shown by reference number 135, the physical medium may store the fingerprint data, the biometric token, and/or the PIN (e.g., in the memory of the physical medium).

Because the processing system is separate and remote from the physical medium and separately stores one or more biometric credentials (e.g., the fingerprint data and/or biometric token), the processing system may provide a secondary check on the authority of a user attempting to gain access to the account, as described in more detail below. As such, the processing system serves as an extra layer of security beyond the requirement of only a fingerprint match via the physical medium.

In some implementations, the physical medium and/or the processing system (e.g., via the account profile) may be able to store the fingerprint data for more than one user. The memory and/or storage of the processing system (e.g., the account profile database) may have greater capacity than the memory of the physical medium. As such, the processing system may store and/or have access to biometric credentials (e.g., fingerprint data and/or biometric tokens) for more users than the physical medium for a particular account (e.g., the physical medium may store a subset of the total biometric credentials associated with the particular account). Thus, the account holder and/or an authorized user may be able to modify what subset of the biometric credentials is stored on the physical medium (e.g., choose which users are authorized to use the physical medium) at a particular time, thereby offering the account holder and/or the authorized user flexibility to control and/or monitor the use of the physical medium, as described in more detail below. Additionally, if the biometric credentials for a particular user is removed from the physical medium, the removed biometric credentials could be subsequently accessed by the processing system such that the set up and activation for the corresponding user would not have to be repeated, thereby conserving processing resources and time.

Although FIG. 1A shows the user device performing the initial scan of the fingerprint, as described above, in some implementations, the user may scan and store fingerprint data directly using the physical medium (in lieu of the physical medium receiving the fingerprint data from the user device) in an activation procedure that activates the fingerprint-based credential entry (e.g., a fingerprint-based PIN entry). The user device may provide instructions to the user to use the fingerprint scanner of the physical medium in a similar manner as for scanning the fingerprint via the user device. Then, the physical medium may transmit the fingerprint data (and/or the PIN) to the user device, which in turn may transfer the fingerprint data (and/or the PIN) to the processing system to be stored and/or to generate a biometric token for each scanned fingerprint, as described above.

Figure 1B:
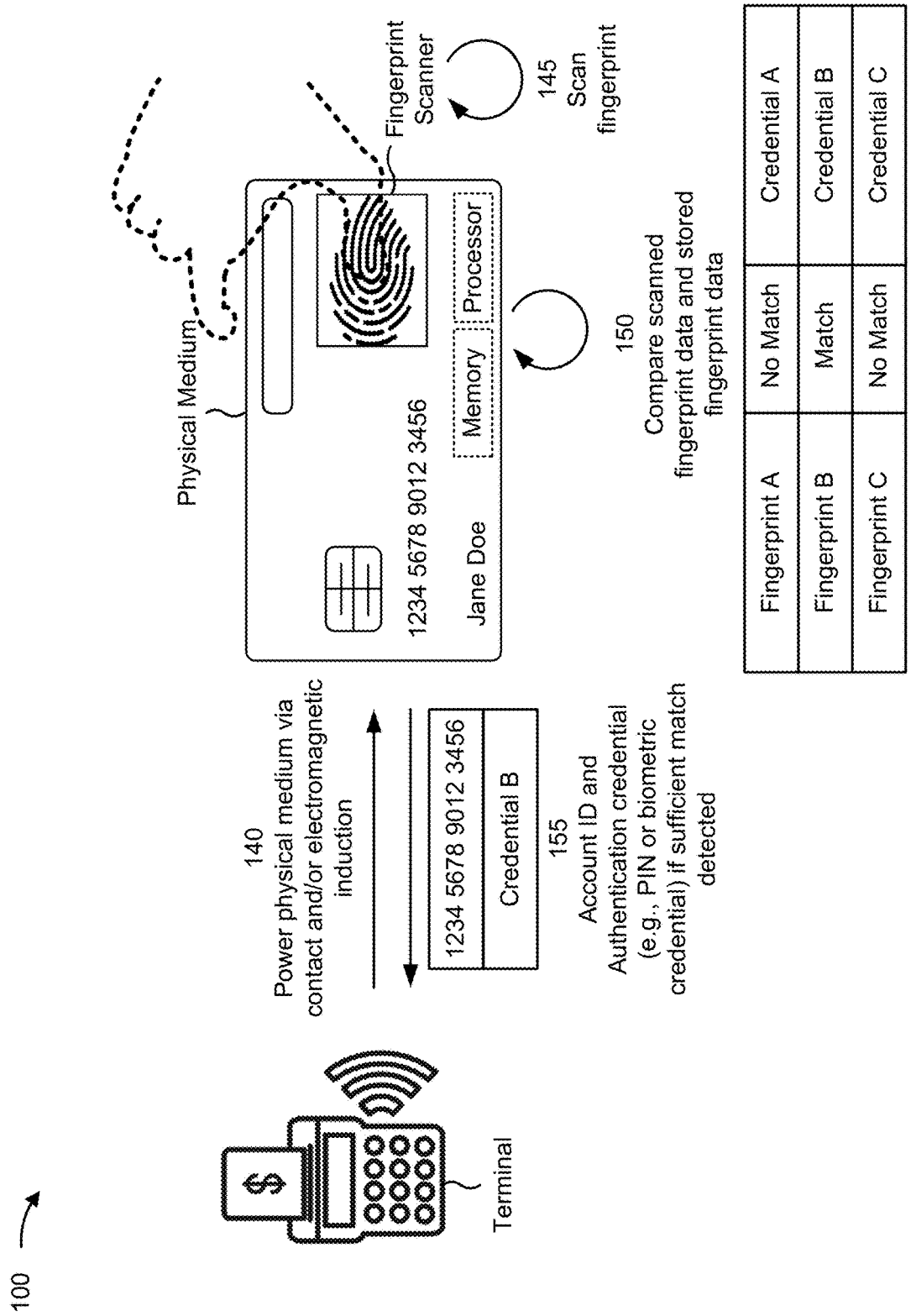

As shown in FIG. 1B, the user may use the physical medium in connection with a terminal, such as a PoS terminal (e.g., at a restaurant, a store, or a retail location), an ATM, a kiosk machine, or a ticketing machine. The physical medium may interact with the terminal either by direct physical contact with the terminal or by being in close proximity to the terminal. For example, the user may tap the physical medium to a designated surface of the terminal, may swipe the physical medium in a card slot of the terminal, or may insert the physical medium into a chip reader of the terminal. As shown by reference number 140, the terminal may provide power to the physical medium by way of the interaction between the physical medium and the terminal. In some implementations, the physical card may have a radio frequency antenna that communicates with the terminal via near-field communication (NFC) or radio frequency identification (RFID) to enable the physical medium to receive the power via electromagnetic induction. Additionally, or alternatively, the physical medium may have a magnetic stripe that may enable the physical medium to receive the power from the terminal via electromagnetic induction. Additionally, or alternatively, the physical medium may include an integrated circuit (e.g., a chip) that enables the physical medium to receive power upon insertion of the physical medium into a chip reader of the terminal. The power received from the terminal may activate the functionality of the physical medium (e.g., the fingerprint scanner).

As shown by reference number 145, the fingerprint scanner may scan a fingerprint of the user. For example, the fingerprint scanner may detect a user interaction with the fingerprint scanner (e.g., the user's finger pressing on the fingerprint scanner one or more times) until the physical medium determines that the scan of the fingerprint is complete (e.g., the scan satisfies a threshold amount of unique identifier information, or minutiae points, captured from the scan). The physical medium may provide a notification (e.g., a sound or a light) that the scan is complete, allowing the user to remove the user's finger from the fingerprint scanner. Alternatively, the user may be required to maintain the user's finger on the fingerprint scanner even after the scan has completed in order for the physical medium to function. The scan of the fingerprint may be in the form of data associated with the fingerprint (e.g., fingerprint data). For example, the scan may be a digital representation of the scanned fingerprint, such as multiple minutiae points (e.g., 17 to 35 minutiae points).

As shown by reference number 150, the physical medium, using the power received from the terminal, may compare the scanned fingerprint data and the stored fingerprint data (e.g., stored in the memory of the physical medium) and determine if there is a sufficient match between the scanned fingerprint data and the stored fingerprint data. For example, the physical medium may determine that the scanned fingerprint data sufficiently matches the stored fingerprint data if at least a threshold number of minutiae points match (e.g., at least 10 minutiae points). As shown by reference number 155, after the physical medium detects a sufficient match, the physical medium may transmit the account identifier (e.g., a PAN) and the authentication credential (e.g., the biometric credential and/or the PIN) to the terminal (e.g., via the NFC, RFID, magnetic stripe, or chip connection powering the physical medium).

For example, as shown in FIG. 1B, the physical medium may have stored fingerprint data for multiple fingerprints (e.g., "Fingerprint A," "Fingerprint B," and "Fingerprint C") corresponding to different fingers (e.g., each corresponding to different fingers of a single user, each corresponding to a finger of a different user, or a combination thereof). Each fingerprint may have a corresponding biometric credential (e.g., "Credential A," "Credential B," and "Credential C"). The physical medium may compare the scanned fingerprint data with the stored fingerprint data for each fingerprint. After detecting a sufficient match of the scanned fingerprint data with the stored fingerprint data corresponding to one of the fingerprints (e.g., "Fingerprint B"), the physical medium may then transmit the corresponding biometric credential (e.g., "Credential B") and/or the PIN, along with the account identifier, to the terminal.

Figure 1C:
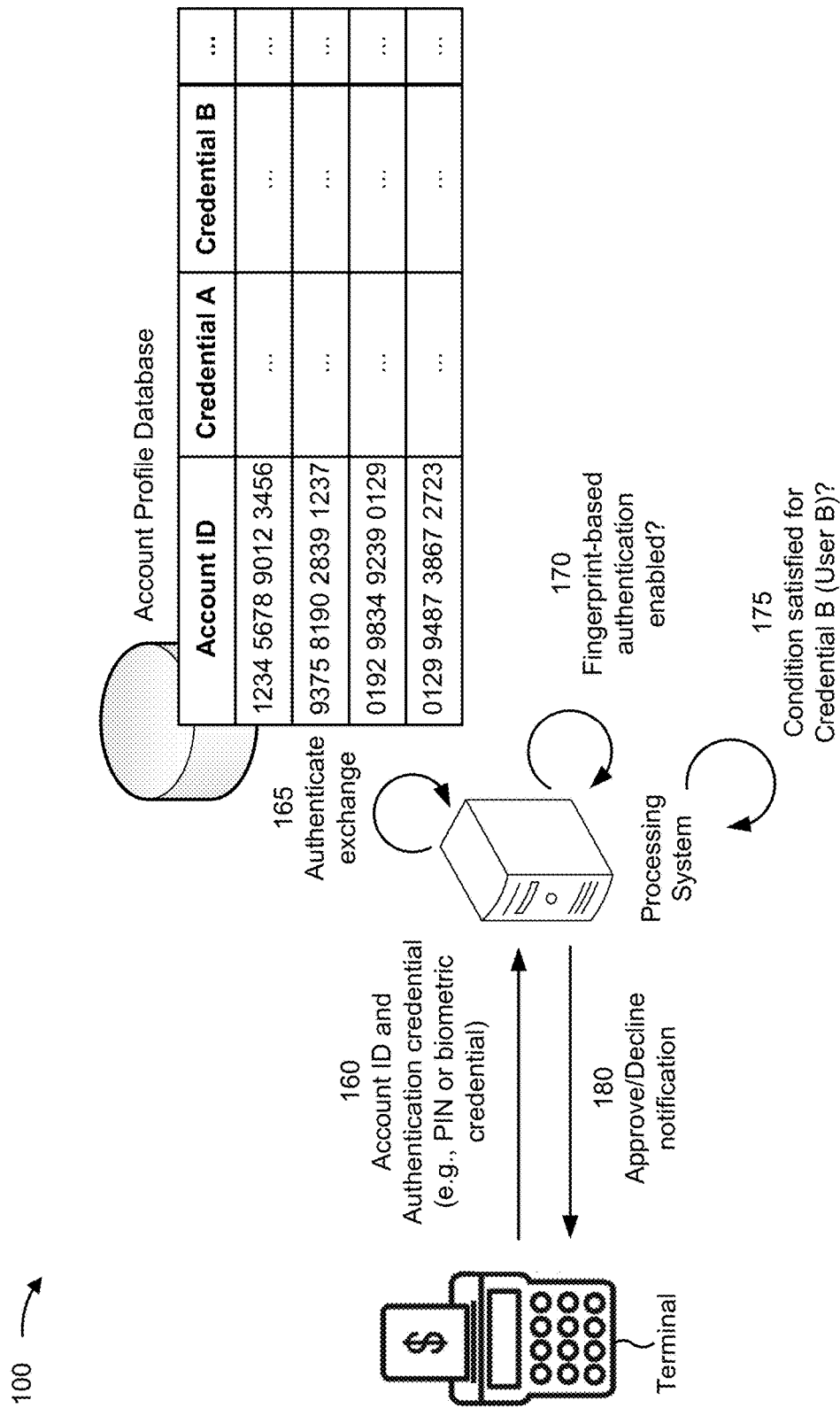

As shown in FIG. 1C, and by reference number 160, the processing system may receive the account identifier and the authentication credential (e.g., the biometric credential and/or the PIN) from the terminal. As shown by reference number 165, the processing system may authenticate the exchange (e.g., the transaction) between the physical medium and the terminal (e.g., verify that the received authentication credential is valid for the account identifier). For example, the processing system may search the account profile database for a stored account identifier that matches the received account identifier, and then compare the received PIN with the stored PIN associated with the account identifier. Additionally, or alternatively, the processing system may compare the received biometric credential (e.g., biometric token) with the stored biometric credential associated with the account identifier. If there is a match (e.g., the received authentication credential is identical to the stored authentication credential), then the processing system may approve the exchange. If there is not a match, then the processing system may decline the exchange.

In some implementations, the account profile may have multiple authentication credentials (e.g., PIN and/or biometric credential) corresponding to multiple users associated with the account identifier (e.g., the account holder and authorized users). One of the users may be designated as a primary user and the remaining users as secondary users. For example, the account holder may be able to select the primary user (e.g., the account holder) and/or the secondary users (e.g., all other users) via an application on the user device (e.g., an application stored on the user device or a web-based application accessed over a network on the user device). The processing system may receive the user designations from the user device (e.g., the application), and may store the designation with the particular user's biometric credential (e.g., in the account profile database). Additionally, or alternatively, the account holder (or the first person whose fingerprint was scanned during set up and activation) may be automatically designated as the primary user and all subsequent users as secondary users. The account holder may be able to modify the default designations (e.g., via the application on the user device). The primary user may have more account permissions (e.g., access to account information and/or ability to make changes to the account) than the secondary users.

In some implementations, there may be a setting associated with the account identifier that allows the fingerprint-based authentication to be enabled or disabled (e.g., the account holder and/or primary user may be able to selectively enable and disable the fingerprint-based authentication feature on the physical medium for a particular user or for all users). When the fingerprint-based authentication feature is disabled, the user for whom the fingerprint-based authentication is disabled will be unable to use the physical medium in an exchange with a terminal. As an example, the account holder and/or primary user may select and/or update an enabled/disabled status for each user via the application on the user device. The processing system may receive the status from the user device (e.g., the application). The processing system may maintain and/or update the enabled/disabled status (e.g., in the account profile database) for each user (e.g., the biometric credential associated with the particular user). The account holder and/or the primary user may actively select the enabled/disabled status (e.g., the status will stay on the selection until the status is actively changed). Additionally, or alternatively, the account holder and/or primary user may set specific parameters for the timing of the disabled status (e.g., schedule specific days and/or time of day that the user's status is set to disabled and/or the duration of the disabled status), which may be automatically maintained by the processing system. Alternatively, the account holder and/or primary user may be able to select the status to be disabled for all categories.

As shown by reference number 170, after the processing system has authenticated the exchange, the processing system may check the enabled/disabled status for the user corresponding to the biometric credential received in the exchange. The processing system may approve or decline the exchange based on the enabled/disabled status for the particular user (e.g., approve the exchange if the status is enabled or decline the exchange if the status is disabled).

As shown by reference number 175, in some implementations, there may be one or more user-specified conditions that need to be satisfied after the processing system has authenticated the exchange before approving or declining the exchange. The one or more conditions may be specific to the user, to the exchange, and/or to the type of authentication credential (e.g., biometric credential or PIN) being used for a particular exchange. For example, one condition may be that a valid user (e.g., a secondary user) is not authorized to perform exchanges without approval from the primary user. Thus, when the processing system matches the received biometric credential with a stored biometric credential of a secondary user (e.g., based on the designation in the account profile database), the processing system may transmit a notification to a user device associated with the primary user requesting approval to authorize the secondary user and/or the secondary user's exchange with the terminal. If the processing system receives an approval indication from the user device (e.g., the primary user approves), then the processing system may approve the exchange. If the processing system receives a denial indication from the user device (e.g., the primary does not approve), then the processing system may decline the exchange. If the processing system does not receive any indication from the user device within a set amount of time (e.g., 1 minute), then the processing system may default to either approving or declining the exchange. The default may be set by the primary user (e.g., account holder) and stored by the processing system.

Additionally, or alternatively, the account holder may be able to selectively set other conditions (e.g., conditions relating to the exchange) restricting the use of the physical medium on secondary users (either specific to a particular secondary user or applied to all secondary users). For example, one condition may be a limit on funds (e.g., an amount of the exchange cannot exceed a maximum amount). As another example, another condition may be based on a third party identifier (e.g., a merchant identifier) associated with the exchange (e.g., the exchange cannot be with a third party, such as a merchant, on a restricted list, and/or can only be with a third party on an approved list). As another example, another condition may be based on a third party type (e.g., a merchant type or merchant category) associated with the exchange (e.g., the exchange can only be made in connection with an approved category, such as food, and/or not in a restricted category, such as video games). As another example, another condition may be based on a date and/or time associated with the exchange (e.g., the exchange can only occur on specific days, such as weekdays, and/or between a specific block of time, and/or the exchange cannot occur on specific days, such as weekends, and/or between a specific block of time).

The approval of the exchange may be based on whether one or more of these conditions are satisfied. For example, if one or more conditions are satisfied, the processing system may automatically approve the exchange. Similarly, if one or more conditions are not satisfied, the processing system may automatically decline the exchange. Alternatively, if one or more conditions are not satisfied, the processing system may transmit a notification to the primary user (e.g., to an application on the user device associated with the primary user) that an exchange is being attempted by a user and requesting an authorization input (e.g., whether the account holder approves or declines the attempted exchange). The notification may include such information as a user identifier (e.g., who is the secondary user attempting the exchange), the particular condition or conditions not being satisfied (e.g., the exchange amount is over the limit on funds), the particular exchange information not satisfying the condition (e.g., the actual exchange amount), and/or other exchange information (e.g. third party identifier). If the processing system receives an approval indication from the user device (e.g., the primary user approves), then the processing system may approve the exchange. If the processing system receives a denial indication from the user device (e.g., the primary does not approve), then the processing system may decline the exchange. If the processing system does not receive any indication from the user device within a set amount of time (e.g., 1 minute), then the processing system may default to declining the exchange.

Additionally, or alternatively, there may be one or more conditions related to the type of authentication credential (e.g., biometric credential or PIN) being used for the exchange. For example, the processing system may receive and match a biometric credential for a secondary user. However, the secondary user and/or the attempted exchange may fail to meet one or more conditions specific to the secondary user (e.g., the exchange amount is greater than the minimum threshold set for the secondary user) set by the primary user, and therefore, the processing system may decline the attempted exchange. In such a scenario, the processing system may temporarily store information related to the attempted exchange (e.g., exchange amount, third party identifier, or third party type) for some threshold amount of time (e.g., 5 or 10 minutes). If a new exchange is attempted within the time threshold via an authentication credential that would result in the exchange being allowed (e.g., the PIN or the biometric credential of another secondary user not restricted by similar conditions), then the processing system may still decline the transaction. Additionally, or alternatively, the processing system may require that all exchanges be made using biometric credentials (e.g., an exchange made via the PIN will be declined). Alternatively, the processing system may store and apply conditions by which exchanges with specific third party identifiers, third party types, and or exchange amounts exceeding a maximum amount are required to be made using biometric credentials (e.g., in which case the exchange would be declined if a PIN, rather than a biometric credential, is received).

Although FIG. 1C illustrates the processing system first determining the enabled/disabled status and then determining whether the user-specified conditions are satisfied, the processing system alternatively may first determine whether the user-specified conditions are satisfied and may then determine the enabled/disabled status.

As shown by reference number 180, the processing system may transmit a notification (e.g., an approve notification or a decline notification) to the terminal based on authenticating the exchange and/or determining that one or more conditions are satisfied. After receiving the exchange, the terminal may complete the exchange with the user using the physical medium.

Figure 1D:
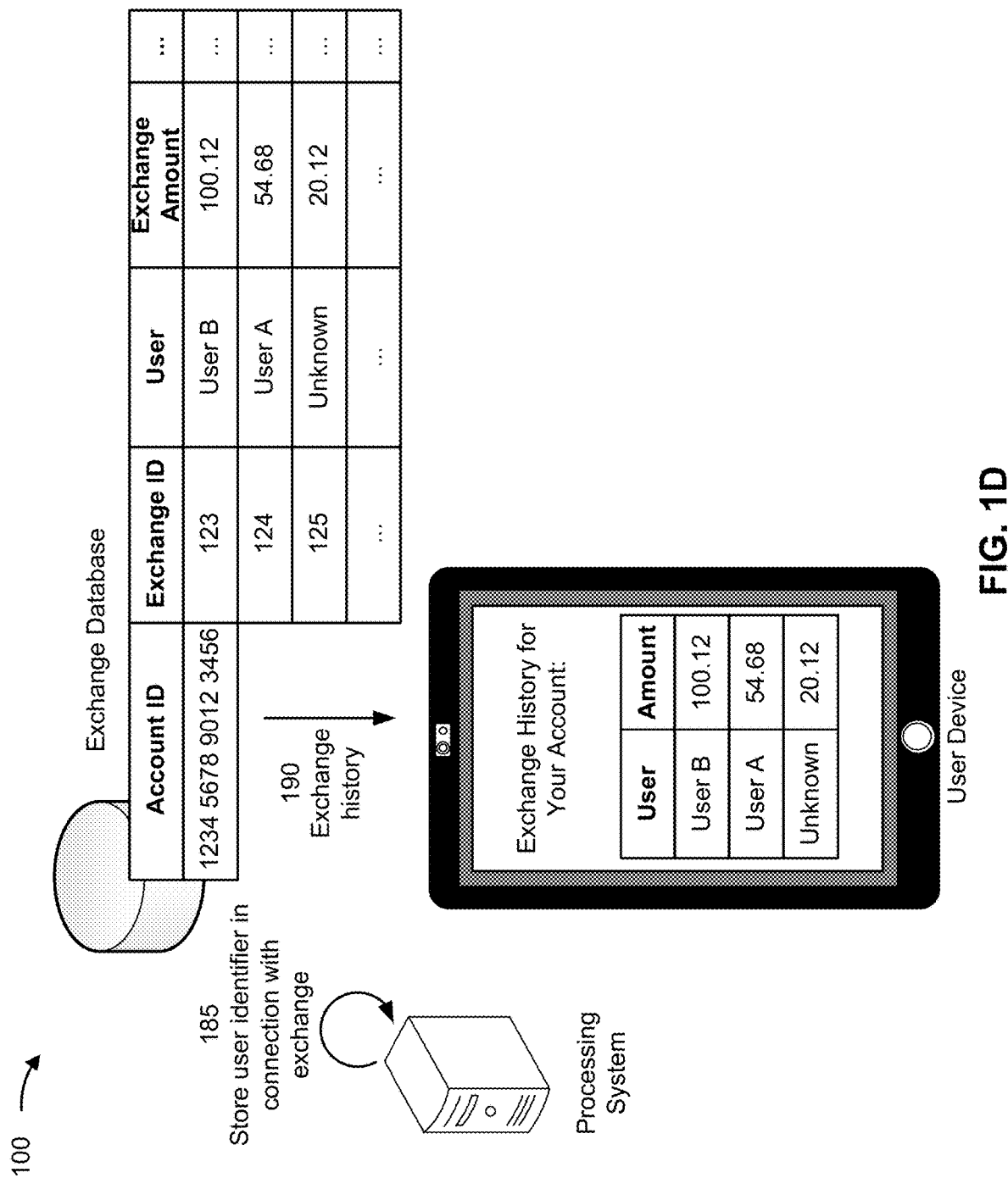

As shown in FIG. 1D, the processing system may include an exchange database in communication with the processing system. The exchange database may include information relating to an exchange history of all or a set number of the most recent exchanges completed for an account profile. For each completed exchange, the exchange database may assign an exchange identifier for the exchange, and may store information relating to the exchange (e.g., the exchange amount, a third party associated with the exchange, and/or a third party type of the third party). Additionally, as shown by reference number 185, where an account profile has multiple users (e.g., multiple authentication credentials) associated with the account profile, the processing system may store a user identifier in connection with the exchange (e.g., an identification of the user whose biometric credential was used to complete the exchange). Additionally, or alternatively, the exchange database may store information relating to exchanges that were declined, including the user identifier attempting to make the exchange.

As shown by reference number 190, the processing system may transmit the exchange history (or a subset of the exchange history) to the user device (e.g., of the primary user or account holder). Thus, the account holder user may be able to monitor the exchanges completed (and/or attempted) on the account, and whether any exchanges were not authorized. The user may also monitor the exchange activity of each secondary user.

The system described above offers multiple levels of security beyond just a PIN or fingerprint to authorize an exchange (e.g., transaction). For example, after matching scanned fingerprint data with stored fingerprint data in the physical medium (e.g., transaction card), a step or condition that results in authorization of a transaction in other fingerprint-based authorization systems, the system described above takes extra security measures. For example, the processing system determines whether authentication credentials (e.g., PIN and/or biometric credentials) transmitted from the physical medium match stored authentication credentials stored by the processing system and/or determines whether certain conditions (e.g., for multiple users) have been satisfied. As such, even if the physical medium was stolen and a fingerprint was lifted and used, an unauthorized user would not be able to have an exchange authorized.

As indicated above, FIGS. 1A-1D are provided as an example. Other examples may differ from what is described with regard to FIGS. 1A-1D.

Figure 2:
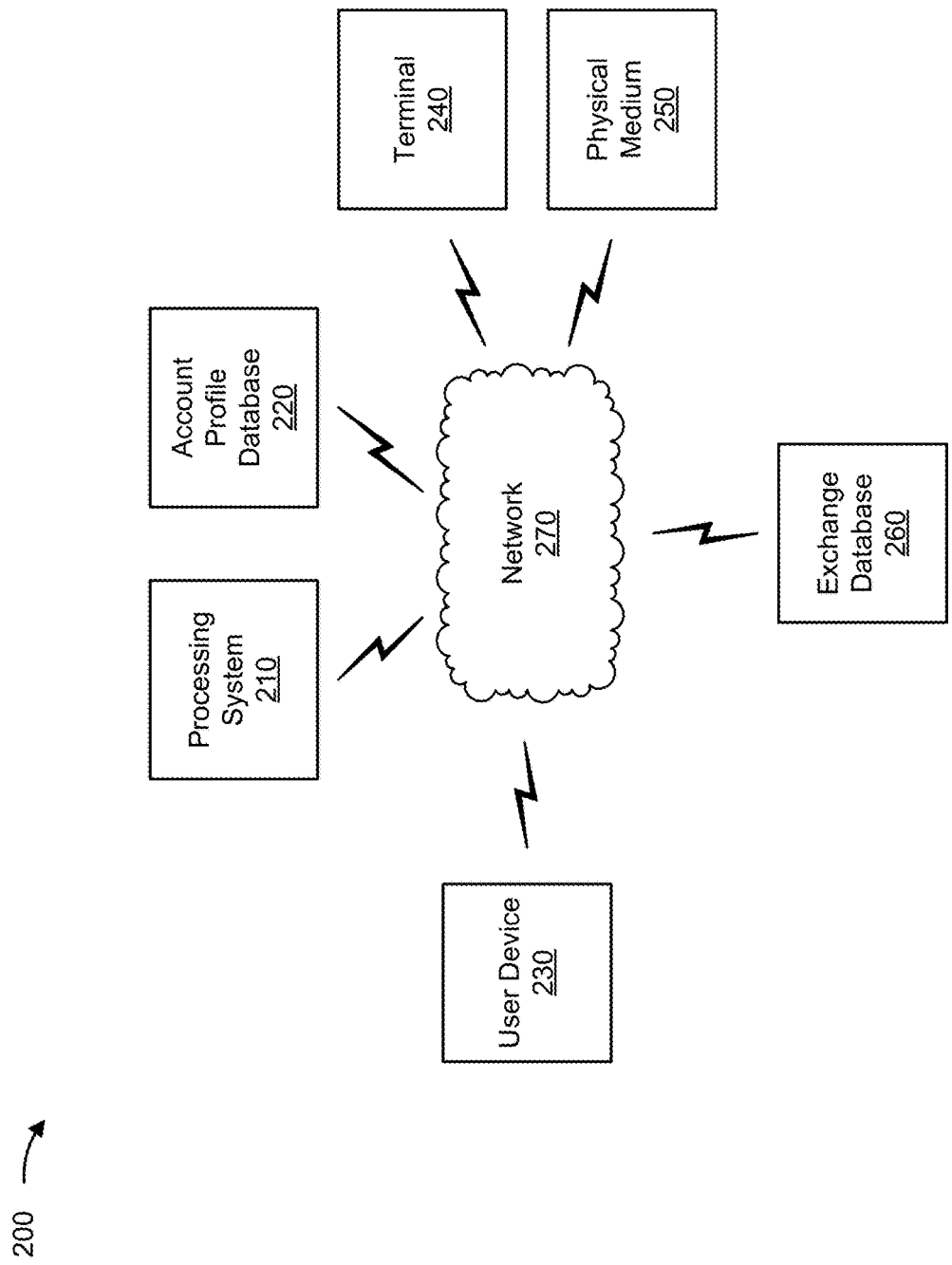
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a processing system 210, an account profile database 220, a user device 230, a terminal 240, a physical medium 250, an exchange database 260, and a network 270. Devices of environment 200 may interconnect via wired connections, wireless connections, or a combination of wired and wireless connections.

The processing system 210 includes one or more devices capable of processing, authorizing, and/or facilitating an exchange (e.g., a transaction). For example, the processing system 210 may include one or more servers and/or computing hardware (e.g., in a cloud computing environment or separate from a cloud computing environment) configured to receive and/or store information associated with processing an electronic exchange. The processing system 210 may process an exchange, such as to approve (e.g., permit, authorize, or the like) or decline (e.g., reject, deny, or the like) the exchange and/or to complete the exchange if the exchange is approved. The processing system 210 may process the exchange based on information received from a terminal, such as exchange data (e.g., information that identifies an exchange amount, a merchant, a time of a transaction, a location of the exchange, or the like), account information communicated to the terminal by a physical medium (e.g., a transaction card, a mobile device executing an application, or the like) and/or information stored by the processing system 210 (e.g., for fraud detection).

The processing system 210 may be associated with a financial institution (e.g., a bank, a lender, a credit card company, or a credit union) and/or may be associated with a transaction card association that authorizes an exchange and/or facilitates a transfer of funds. For example, the processing system 210 may be associated with an issuing bank associated with the physical medium, an acquiring bank (or merchant bank) associated with the merchant and/or the terminal, and/or a transaction card association (e.g., VISA® or MASTERCARD®) associated with the physical medium. Based on receiving information associated with the physical medium from the terminal, one or more devices of the processing system 210 may communicate to authorize an exchange and/or to transfer funds from an account associated with the physical medium to an account of an entity (e.g., a merchant) associated with the terminal.

The account profile database 220 includes one or more devices capable of receiving, generating, storing, processing, and/or providing information associated with fingerprint-based credential entry, as described elsewhere herein. The account profile database 220 may include a communication device and/or a computing device. For example, the account profile database 220 may include a data structure, a database, a data source, a server, a database server, or a similar type of device. As an example, the account profile database 220 may store account information, including an account identifier, a PIN, and one or more biometric credentials (e.g., fingerprint data and biometric tokens), as described elsewhere herein.

The user device 230 includes one or more devices capable of receiving, generating, storing, processing, and/or providing information associated with fingerprint-based credential entry, as described elsewhere herein. The user device 230 may include a communication device and/or a computing device. For example, the user device 230 may include a wireless communication device, a mobile phone, a laptop computer, a tablet computer, a desktop computer, or a similar type of device. As described above, the user device 230 may include a fingerprint scanner.

The terminal 240 includes one or more devices capable of facilitating an electronic exchange. For example, the terminal 240 may include a point-of-sale (PoS) terminal, a payment terminal (e.g., a credit card terminal, a contactless payment terminal, a mobile credit card reader, or a chip reader), a secure access terminal (e.g., a terminal equipped with an encrypted connection to a server and/or database), a financial service kiosk (e.g., a banking kiosk), and/or an automated teller machine (ATM). The terminal 240 may include one or more input components and/or one or more output components to facilitate obtaining data (e.g., account information) from a physical medium (e.g., a transaction card, a mobile device executing an payment application, or the like) and/or to facilitate interaction with and/or authorization from an owner or accountholder of the physical medium. Example input components of the terminal 240 include a number keypad, a touchscreen, a magnetic stripe reader, a chip reader, and/or an RF signal reader (e.g., an NFC reader). Example output devices of the terminal 240 include a display and/or a speaker.

The physical medium 250 may be a device capable of being used for an electronic exchange. The physical medium 250 may include integrated circuitry capable of storing and communicating account information. For example, the physical medium 250 may be a transaction card, such as a credit card, a debit card, a gift card, an ATM card, a transit card, a fare card, and/or an access card. The physical medium 250 may store account information associated with the physical medium 250, which may be used in connection with an electronic exchange. The account information may include, for example, an account identifier that identifies an account (e.g., a bank account or a credit account) associated with the physical medium 250 (e.g., an account number, a card number, a bank routing number, and/or a bank identifier), a cardholder identifier (e.g., identifying a name of a person, business, or entity associated with the account or the physical medium 250), expiration information (e.g., identifying an expiration month and/or an expiration year associated with the physical medium 250), and/or a credential (e.g., a payment token). In some implementations, the physical medium 250 may store the account information in tamper-resistant memory of the physical medium 250, such as in a secure element. As part of performing an electronic exchange, the physical medium 250 may transmit the account information to a terminal using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the physical medium 250 and the terminal may communicate with one another by coming into contact with one another (e.g., using a magnetic stripe or an EMV chip) or via contactless communication (e.g., using NFC). As described above, the physical medium 250 may include a fingerprint scanner, memory, and one or more processors.

The exchange database 260 includes one or more devices capable of receiving, generating, storing, processing, and/or providing information associated with fingerprint-based credential entry, as described elsewhere herein. The exchange database 260 may include a communication device and/or a computing device. For example, the exchange database 260 may include a data structure, a database, a data source, a server, a database server, or a similar type of device. As an example, the exchange database 260 may store a history of exchanges, including an exchange identifier, an exchange amount, and/or a user identifier associated with a respective exchange, as described elsewhere herein.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
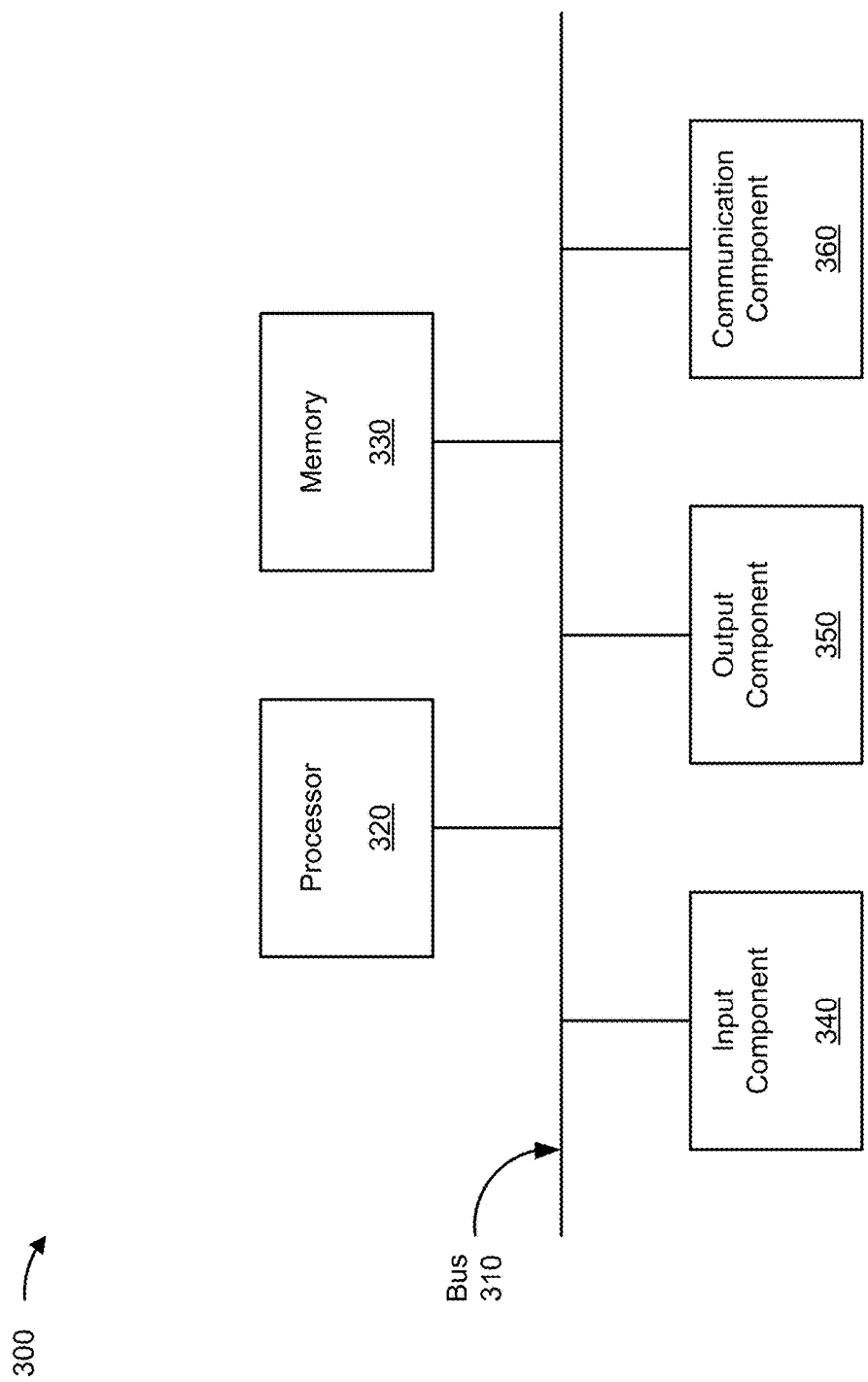
FIG. 3 is a diagram of example components of one or more devices of FIG. 2.

FIG. 3 is a diagram of example components of a device 300, which may correspond to the processing system 210, the account profile database 220, the user device 230, the terminal 240, the physical medium 250, and/or the exchange database 260. In some implementations, the processing system 210, the account profile database 220, the user device 230, the terminal 240, the physical medium 250, and/or the exchange database 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
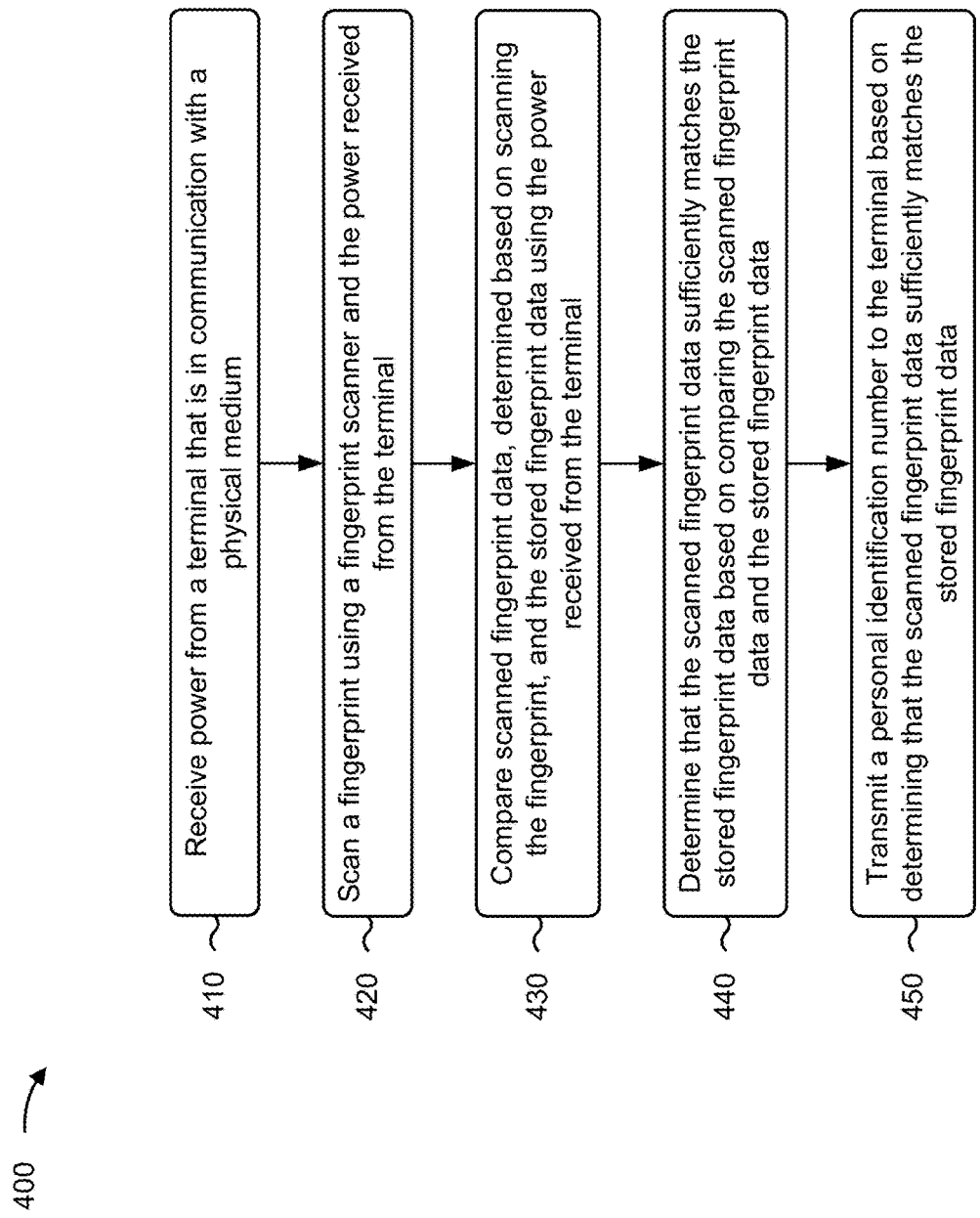

FIG. 4 is a flowchart of an example process 400 associated with fingerprint-based credential entry. In some implementations, one or more process blocks of FIG. 4 may be performed by a physical medium (e.g., physical medium 250). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving power from a terminal that is in communication with a physical medium (block 410). As further shown in FIG. 4, process 400 may include scanning a fingerprint using the fingerprint scanner and the power received from the terminal (block 420). As further shown in FIG. 4, process 400 may include comparing scanned fingerprint data, determined based on scanning the fingerprint, and the stored fingerprint data using the power received from the terminal (block 430). As further shown in FIG. 4, process 400 may include determining that the scanned fingerprint data sufficiently matches the stored fingerprint data based on comparing the scanned fingerprint data and the stored fingerprint data (block 440). As further shown in FIG. 4, process 400 may include transmitting a PIN to the terminal based on determining that the scanned fingerprint data sufficiently matches the stored fingerprint data (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with fingerprint-based credential entry. In some implementations, one or more process blocks of FIG. 5 may be performed by a system (e.g., processing system 210). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a terminal, an account identifier and an authentication credential based on an interaction between the terminal and a physical medium that stores the account identifier and the authentication credential (block 510). As further shown in FIG. 5, process 500 may include authenticating the exchange using the account identifier and the authentication credential (block 520). As further shown in FIG. 5, process 500 may include identifying, after authenticating the exchange, a user associated with the authentication credential based on an account profile associated with the account identifier, wherein the account profile stores: one or more primary authentication credentials corresponding to one or more primary users associated with the account identifier, and one or more secondary authentication credentials corresponding to one or more secondary users associated with the account identifier (block 530). As further shown in FIG. 5, process 500 may include determining that the user is a secondary user of the one or more secondary users (block 540). As further shown in FIG. 5, process 500 may include determining a user-specified condition associated with the secondary user, wherein the user-specified condition is specified by a primary user of the one or more primary users (block 550). As further shown in FIG. 5, process 500 may include determining whether the user-specified condition is satisfied (block 560). As further shown in FIG. 5, process 500 may include transmitting one of an approve notification for the exchange or a deny notification for the exchange to the terminal based on whether the user-specified condition is satisfied (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for fingerprint-based authentication, the system comprising:
    a financial transaction card that includes:
        a fingerprint scanner,
        a processor, and
        memory that stores fingerprint data, an account identifier, and a biometric token, generated from the fingerprint data for a fingerprint, that includes a series of characters indicating a globally unique identifier associated with the fingerprint,
        wherein the biometric token is an authentication credential for use in authenticating an exchange of the financial transaction card;
    wherein the financial transaction card is configured to:
        receive power from a terminal that is in communication with the financial transaction card for performing the exchange;
        determine whether scanned fingerprint data, scanned by the financial transaction card, sufficiently matches the stored fingerprint data; and
        transmit, to the terminal, the biometric token and the account identifier based on determining that the scanned fingerprint data sufficiently matches the stored fingerprint data; and
    a processing system that includes:
        one or more memories; and
        one or more processors, communicatively coupled to the one or more memories, configured to:
            receive the account identifier and the biometric token from the terminal;
            authenticate the exchange between the financial transaction card and the terminal by verifying that the authentication credential is valid for the account identifier;
            check, after authenticating the exchange, a status indicating whether the fingerprint-based authentication is enabled or disabled in connection with the account identifier, wherein the status indicates that the fingerprint-based authentication is disabled; and
            deny the exchange based on the status indicating that the fingerprint-based authentication is disabled.

2. The system of claim 1, wherein the one or more processors of the processing system are further configured to:
    receive, from a user device, the status; and
    maintain or update the status in an account profile database.

3. The system of claim 1, wherein the memory of the financial transaction card stores fingerprint data for a plurality of users associated with the account identifier; and
    wherein the financial transaction card, to determine that the scanned fingerprint data sufficiently matches the stored fingerprint data, is configured to determine that the scanned fingerprint data sufficiently matches the stored fingerprint data based on a sufficient match with fingerprint data for one of the plurality of users.

4. The system of claim 1, wherein the one or more processors of the processing system are further configured to:
    identify a user associated with the authentication credential based on an account profile associated with the account identifier, wherein the account profile stores a plurality of authentication credentials corresponding to a plurality of users associated with the account identifier; and
    transmit or store information indicating that the exchange is associated with the user.

5. The system of claim 1, wherein the one or more processors of the processing system are further configured to:
    identify a user associated with the authentication credential based on an account profile associated with the account identifier, wherein the account profile stores a plurality of authentication credentials corresponding to a plurality of users associated with the account identifier;

determine that the user is a valid user but is not authorized to perform exchanges without approval from a primary user;

transmit a message to a user device associated with the primary user based on determining that the user is the valid user but is not authorized to perform exchanges without the approval from the primary user; and receive an approval indication from the user device associated with the primary user, wherein the one or more processors of the processing system are configured to transmit an approve notification based on receiving the approval indication.

6. The system of claim 1, wherein the biometric token is generated based on the stored fingerprint data.

7. The system of claim 1, wherein the biometric token is associated with a personal identification number (PIN).

8. A financial transaction card for fingerprint-based authentication, the financial transaction card comprising:

a fingerprint scanner;

one or more memories that store fingerprint data and a biometric token, generated from the fingerprint data, that includes a series of characters indicating a globally unique identifier associated with a fingerprint, wherein the biometric token is an authentication credential for use in authenticating an exchange between the financial transaction card and a terminal that is in communication with the financial transaction card; and one or more processors, communicatively coupled to the one or more memories, configured to:

receive power from the terminal;

determine whether scanned fingerprint data, scanned by the financial transaction card, sufficiently matches the stored fingerprint data;

transmit the biometric token to the terminal based on determining that the scanned fingerprint data sufficiently matches the stored fingerprint data;

authenticate the exchange by verifying that the authentication credential is valid for an account identifier;

check, after authenticating the exchange, a status indicating whether the fingerprint-based authentication is enabled or disabled in connection with the account identifier, wherein the status indicates that the fingerprint-based authentication is disabled; and deny the exchange based on the status indicating that the fingerprint-based authentication is disabled.

9. The financial transaction card of claim 8, wherein the one or more processors are further configured to transmit an account identifier, associated with the financial transaction card, to the terminal based on determining that the scanned fingerprint data sufficiently matches the stored fingerprint data, wherein the account identifier in combination with the biometric token enables authorization of the exchange.

10. The financial transaction card of claim 8, wherein the one or more processors are further configured to:

detect a user interaction with the fingerprint scanner in connection with an activation procedure that activates fingerprint-based personal identification number (PIN) entry for the financial transaction card; and store the fingerprint data in the one or more memories based on detecting the user interaction with the fingerprint scanner in connection with the activation procedure.

11. The financial transaction card of claim 8, wherein the one or more processors are further configured to:

receive the fingerprint data from a device that is different from the financial transaction card; and store the fingerprint data in the one or more memories based on receiving the fingerprint data from the device.

12. The financial transaction card of claim 8, wherein the one or more processors are further configured to:

receive the biometric token in connection with an activation procedure; and store the biometric token in the one or more memories based on receiving the biometric token.

13. The financial transaction card of claim 8, wherein the one or more processors are further configured to:

store, in the one or more memories, an indication of whether the fingerprint-based authentication is enabled or disabled for the financial transaction card.

14. The financial transaction card of claim 8, wherein the one or more memories store at least first fingerprint data, for a first user associated with an account identifier that is associated with the financial transaction card, and second fingerprint data for a second user associated with the account identifier; and wherein the one or more processors, to determine that the scanned fingerprint data sufficiently matches the stored fingerprint data, are configured to determine that the scanned fingerprint data sufficiently matches at least one of the first fingerprint data or the second fingerprint data.

15. The financial transaction card of claim 8, further comprising at least one of:

a radio frequency antenna that communicates with the terminal via near-field communication or radio frequency identification to enable the financial transaction card to receive the power via electromagnetic induction, or a magnetic stripe that enables the financial transaction card to receive the power from the terminal via the electromagnetic induction.

16. A method of authentication, comprising:

receiving, by a system and from a terminal, an account identifier and a biometric token based on an interaction between the terminal and a financial transaction card that stores the account identifier and the biometric token, wherein the biometric token is generated from fingerprint data for a fingerprint and includes a series of characters indicating a globally unique identifier associated with the fingerprint, and wherein the biometric token is an authentication credential that is communicated from the financial transaction card to the terminal in connection with an exchange;

authenticating, by the system, the exchange using the account identifier and the biometric token;

check, after authenticating the exchange, a status indicating whether fingerprint-based authentication is enabled or disabled in connection with the account identifier, wherein the status indicates that the fingerprint-based authentication is disabled;

identifying, by the system and after authenticating the exchange, a user associated with the biometric token based on an account profile associated with the account identifier, wherein the account profile stores:

one or more primary authentication credentials corresponding to one or more primary users associated with the account identifier, and one or more secondary authentication credentials corresponding to one or more secondary users associated with the account identifier;

determining, by the system, that the user is a secondary user of the one or more secondary users;

determining, by the system, a user-specified condition associated with the secondary user, wherein the user-specified condition is specified by a primary user of the one or more primary users;

determining, by the system, whether the user-specified condition is satisfied; and transmitting, by the system, a deny notification for the exchange to the terminal based on whether the user-specified condition is satisfied and based on the status indicating that the fingerprint-based authentication is disabled.

17. The method of claim 16, wherein the user-specified condition is that the secondary user is not authorized to perform exchanges without approval from the primary user; and wherein the method further comprises:

transmitting a message to a user device associated with the primary user based on determining that the secondary user is not authorized to perform exchanges without the approval from the primary user;

receiving an approval indication from the user device associated with the primary user; and transmitting an approve notification for the exchange based on receiving the approval indication from the user device.

18. The method of claim 16, wherein the user-specified condition is based on at least one of:

an amount of the exchange, a third party identifier associated with the exchange, a third party type associated with the exchange, or a date or time associated with the exchange.

19. The method of claim 16, further comprising transmitting or storing information indicating that the exchange is associated with the secondary user.

20. The method of claim 16, further comprising:

receiving, from a user device, the status.

* * * * *